United States Patent
Yamamori et al.

(10) Patent No.: US 10,011,775 B2
(45) Date of Patent: Jul. 3, 2018

(54) OIL PURIFYING APPARATUS

(71) Applicant: TOKUDEN CO., LTD., Kyoto-shi, Kyoto (JP)

(72) Inventors: Kiyohiro Yamamori, Kyoto (JP); Katsuichi Ichikawa, Kyoto (JP); Toru Tonomura, Otsu (JP); Yoshio Kitano, Kyoto (JP); Yasuhiro Fujimoto, Kyoto (JP)

(73) Assignee: TOKUDEN CO., LTD., Kyoto-shi, Kyoto (JP)

( * ) Notice: Subject to any disclaimer, the term of this patent is extended or adjusted under 35 U.S.C. 154(b) by 249 days.

(21) Appl. No.: 14/928,368

(22) Filed: Oct. 30, 2015

(65) Prior Publication Data

US 2016/0122655 A1    May 5, 2016

(30) Foreign Application Priority Data

Oct. 31, 2014   (JP) .................................. 2014-222566

(51) Int. Cl.
| | |
|---|---|
| *C10G 31/06* | (2006.01) |
| *C10G 1/02* | (2006.01) |
| *C10G 1/08* | (2006.01) |
| *C10G 1/00* | (2006.01) |

(52) U.S. Cl.
CPC .............. *C10G 1/02* (2013.01); *C10G 1/002* (2013.01); *C10G 1/08* (2013.01); *Y02E 50/30* (2013.01); *Y02P 30/20* (2015.11)

(58) Field of Classification Search
CPC ............. C10G 31/06; C10G 1/02; C10G 1/08
USPC ....................................................... 422/198
See application file for complete search history.

(56) References Cited

U.S. PATENT DOCUMENTS

| | | | | |
|---|---|---|---|---|
| 2,785,271 | A | * | 3/1957 | Baly ........................ F22B 1/284 |
| | | | | 392/400 |
| 2001/0011457 | A1 | | 8/2001 | Shishido et al. |
| 2003/0136317 | A1 | | 7/2003 | Shibata |
| 2005/0254803 | A1 | | 11/2005 | Ono |
| 2013/0202276 | A1 | | 8/2013 | Masuda et al. |

FOREIGN PATENT DOCUMENTS

| | | |
|---|---|---|
| JP | 2005342630 A | 12/2005 |
| JP | 2008174660 A | 7/2008 |
| JP | 2011086443 A | 4/2011 |

OTHER PUBLICATIONS

European Patent Office, Extended European Search Report Issued in European Patent Application No. 15191889.3, Mar. 29, 2016, 8 pages.

* cited by examiner

*Primary Examiner* — Huy Tram Nguyen

(74) *Attorney, Agent, or Firm* — Alleman Hall Creasman & Tuttle LLP

(57) ABSTRACT

In order to improve heat recovery efficiency in purifying oil from an organic substance using superheated steam, the present invention provides an oil purifying apparatus for thermally decomposing an organic substance with superheated steam and purifying oil from gas components generated by thermal decomposition, which includes: a heat treatment container for storing the organic substance; and a superheated steam generating part for generating the superheated steam to be supplied into the heat treatment container, and the superheated steam generating part is provided in the heat treatment container.

4 Claims, 4 Drawing Sheets

OIL PURIFYING APPARATUS

TECHNICAL FIELD

The present invention relates to an oil purifying apparatus for thermally decomposing an organic substance with superheated steam and purifying oil from gas components generated by the thermal decomposition.

BACKGROUND ART

A conventional oil purifying apparatus, such as that disclosed in Patent Literature 1, is equipped with: a superheated steam generating device for generating superheated steam; a heat treatment container (heating furnace) such as, for example, a rotary kiln for accommodating an organic substance and thermally decomposing the organic substance with the superheated steam supplied from the superheated steam generating device; and a piping facility for supplying the superheated steam from the superheated steam generating device to the heat treatment container. This piping facility is equipped with: a piping structure for connecting the superheated steam generating device and the heat treatment container; and a heating mechanism for keeping a temperature of the superheated steam passing through the piping structure to be a desired temperature, and the like.

In the oil purifying apparatus of a conventional configuration, however, in addition to requiring a heat quantity to be applied to the superheated steam generating device and the heat treatment container and a heat quantity to be applied to the heating mechanism, a ratio of a heat quantity of produced oil (recovered heat quantity) to the heat quantity applied to the entire oil purifying apparatus (applied heat quantity) is small, and therefore practical use thereof is hindered.

CITATION LIST

Patent Literature

Patent Literature 1: JP2011-86443A

SUMMARY OF INVENTION

Technical Problem

Therefore, the present invention has been made in order to solve the above problems at once, and an essential object thereof is to improve heat recovery efficiency in an oil purifying apparatus for purifying oil from an organic substance using superheated steam.

Solution to Problem

That is, an oil purifying apparatus according to one aspect of the present invention is configured to thermally decompose an organic substance with superheated steam and purify oil from gas components generated by thermal decomposition. The oil purifying apparatus includes:

a heat treatment container for storing the organic substance; and a superheated steam generating part for generating the superheated steam to be supplied into the heat treatment container. In this configuration, the superheated steam generating part is provided in the heat treatment container. Here, as the organic substance, for example, those contained in waste such as industrial waste and general waste or those derived from animals and plants (biomass) are considered.

With this configuration, since the superheated steam generating part is provided in the heat treatment container in which the organic substance is thermally decomposed and it is configured so as to generate the superheated steam in the heat treatment container, a piping facility for the superheated steam can be made unnecessary. Therefore, it is possible to eliminate a heating quantity inputted to the conventional piping facility for the superheated steam or a heating quantity which is lost due to heat radiation of the piping facility, and thus the heat recovery efficiency can be improved by the oil purifying apparatus. Further, by providing the superheated steam generated part in the heat treatment container, the oil purifying apparatus can be made smaller than the conventional one.

It is preferable that the superheated steam generating part includes: a conductor pipe having an inlet port for introducing water or steam into the superheated steam generating part and an outlet port for deriving the superheated steam; and an electric heating mechanism for electrically heating the conductor pipe and causing the superheated steam to be generated. At this time, the inlet port is opened outward of the heat treatment container and the outlet port is opened inward of the heat treatment container. Thus, a water supply pipe or a steam supply pipe provided outside the oil purifying apparatus is connected to the inlet port.

In this way, since the superheated steam generating part is adapted to an electric heating method and the conductor pipe is Joule-heated, the heating amount necessary for generating the superheated steam can be reduced as compared to the other methods. Further, since it is sufficient to adopt a configuration supplying electric current to the conductor pipe and it is not necessary to provide a heat source outside the conductor pipe, the configuration of the superheated steam generating part can be made smaller and simplified. Therefore, the superheated steam generating part can be easily provided inside the heat treatment container.

It is preferable that the conductor pipe is formed to have a straight pipe shape and a plurality of outlet ports are provided along a flow path direction in an outer surface of the conductor pipe.

With this configuration, since the conductor pipe is formed to have a straight pipe shape, it is possible to have a configuration that the superheated steam generating part is provided by inserting the same to the inside of the heat treatment container from a side wall thereof. Therefore, the superheated steam generating part can be easily provided in the heat treatment container. Moreover, since the plurality of outlet ports are provided in the outer surface of the conductor pipe, the superheated steam can be easily spread to the entire inner space of the heat treatment container and the organic substance in the heat treatment container can be uniformly subjected to thermal decomposition.

It is preferable that the electric heating mechanism includes: a first power supply member connected to one end side of the conductor pipe; a second power supply member connected to another end side of the conductor pipe; and an AC power supply for applying an AC voltage between the first power supply member and the second power supply. Additionally, in this configuration, the second power supply member has a covering body covering substantially an entire circumference of an outer circumferential surface from the other end side to the one end side of the conductor pipe, and an end of the other end side is electrically connected to the conductor pipe.

With this configuration, the current flowing in the conductor pipe and the current flowing in the second power supply member, specifically, the current flowing in the covering body, are in opposite directions. Therefore, magnetic fluxes generated by the respective currents are cancelled by each other and a reactance generated in the conductor pipe is reduced and it is possible to improve a circuit power factor. Therefore, it is possible to improve the energy efficiency of the superheated steam generating part and, as a result, the heat recovery efficiency can be improved. Further, since substantially the entire circumference of the outer circumferential surface from the other end side to the one end side of the conductor pipe is covered by the covering body, the covering body also functions as a heat insulating member, and it is possible to prevent a temperature drop of the conductor pipe and the superheated steam flowing in the conductor pipe.

It is preferable that a plurality of ejection nozzles are provided along the flow path direction in the outer surface of the conductor pipe, and one or more through holes are formed in the covering body corresponding to the plurality of ejection nozzles in order to expose the plurality of ejection nozzles outside of the conductor body.

With this configuration, by providing the ejection nozzles on the conductor pipe, it is possible to eject the superheated steam to a predetermined ejection range defined by the ejection nozzles. Therefore, the organic substance can be thermally decomposed efficiently and the oil purifying efficiency can be improved, and as a result, the heat recovery efficiency can be also improved. Here, the ejection nozzles provided on the conductor pipe are selected depending on the applications.

It is preferable that the heat treatment container is a rotary kiln, and the superheated steam generating part is provided along a rotating shaft of the rotary kiln inside the same.

By using the rotary kiln in this way, the organic substance can be stirred and the thermal decomposition can be accelerated. Moreover, since the superheated steam generating part is provided along a direction of the rotating shaft of the rotary kiln, the superheated steam generating part can be easily installed.

It is preferable that the oil purifying apparatus further includes a metal extraction part for extracting metal from residue resulting from the thermal decomposition of the organic substance.

With this configuration, not only the oil from the organic substance but also the metal contained in the organic substance can be recovered.

Advantageous Effects of Invention

According to the present invention configured in this way, since the superheated steam generating part is provided in the heat treatment container in which the organic substance is thermally decomposed and it is configured so as to generate the superheated steam in the heat treatment container, the heat recovery efficiency of purifying the oil from the organic substance using superheated steam can be improved.

DESCRIPTION OF EMBODIMENTS

The following describes one embodiment of an oil purifying apparatus according to the present invention with reference to the accompanying drawings.

The oil purifying apparatus 100 according to the present embodiment is intended to thermally decompose an organic substance using superheated steam, allowing a reaction between gas components produced by the thermal decomposition and a catalyst to remove impurities, and to cool the gas components which have passed through the catalyst to purify cracked products such as a biodiesel fuel.

Here, as the organic substance, an organic substance contained in waste such as industrial waste and general waste, or, for example, those derived from plants and animals such as vermin including deer and wild boars (biomass), may be also available.

Figure 1:
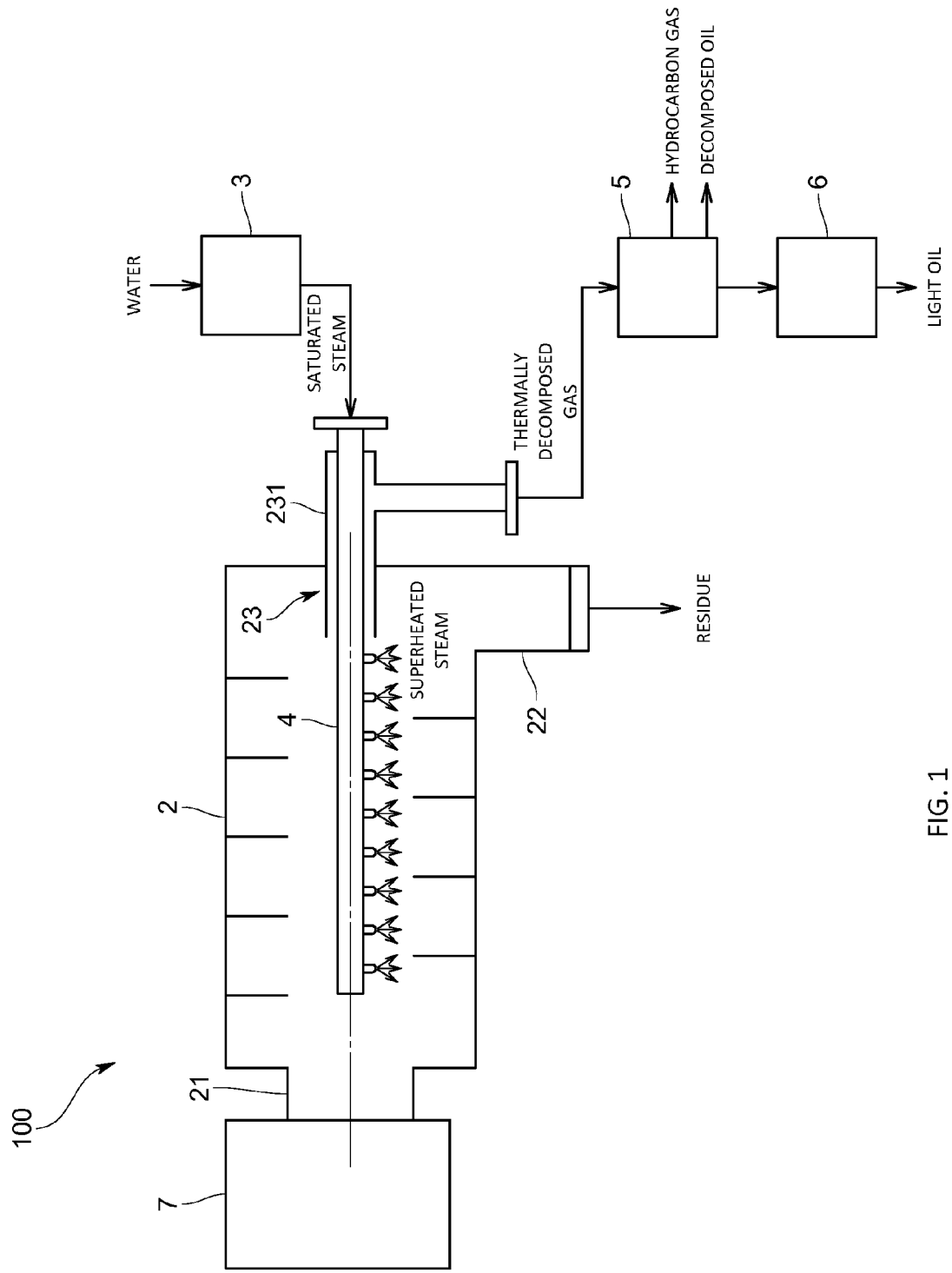
FIG. 1 is a schematic diagram showing a configuration of an oil purifying apparatus according to the present embodiment.

Specifically, as shown in FIG. 1, the oil purifying apparatus 100 is equipped with: a heat treatment container 2 in which an organic substance is accommodated; a steam generating part 3 for generating steam (for example, saturated steam) from water; a superheated steam generating part 4 for generating superheated steam from the steam to be supplied to the heat treatment container 2; a catalyst part 5 for removing impurities from the thermally decomposed gas (gas components) generated in the heat treatment container 2; and a cooling part 6 for cooling the thermally decomposed gas which has passed through the catalyst part 5 and performing gravity separation between the water and the oil.

The heat treatment container 2 is a rotary kiln which is installed so that a rotary shaft thereof is horizontal. Further, an organic substance inlet portion 21 for introducing an organic substance is provided at one end in the shaft direction of the heat treatment container 2. In the organic substance inlet portion 21 of the present embodiment, an inlet hopper 7 for inletting an organic substance is provided. The heat treatment container 2 is configured so as to move an introduced organic substance from one end in the shaft direction to the other end in the shaft direction while stirring the same by the rotation of the heat treatment container 2. Moreover, a discharge portion 22 for discharging residues produced by thermal decomposition of the organic substance to the outside is provided at the other end in the shaft direction of the heat treatment container 2. Note that the heat treatment container 2 is made of stainless steel such as, for example, SUS403, and on its inner surface, there is formed a ceramic coating layer such as, for example, water glass.

The superheated steam generating part 4 is intended to generate superheated steam by heating steam generated by the saturated steam generating part 3 and it is provided inside the heat treatment container 2 to thereby generate the superheated steam inside the heat treatment container 2. Note that a temperature of the superheated steam is a thermal decomposition temperature of an organic substance, for example, 500° C. to 600° C.

Figure 2:
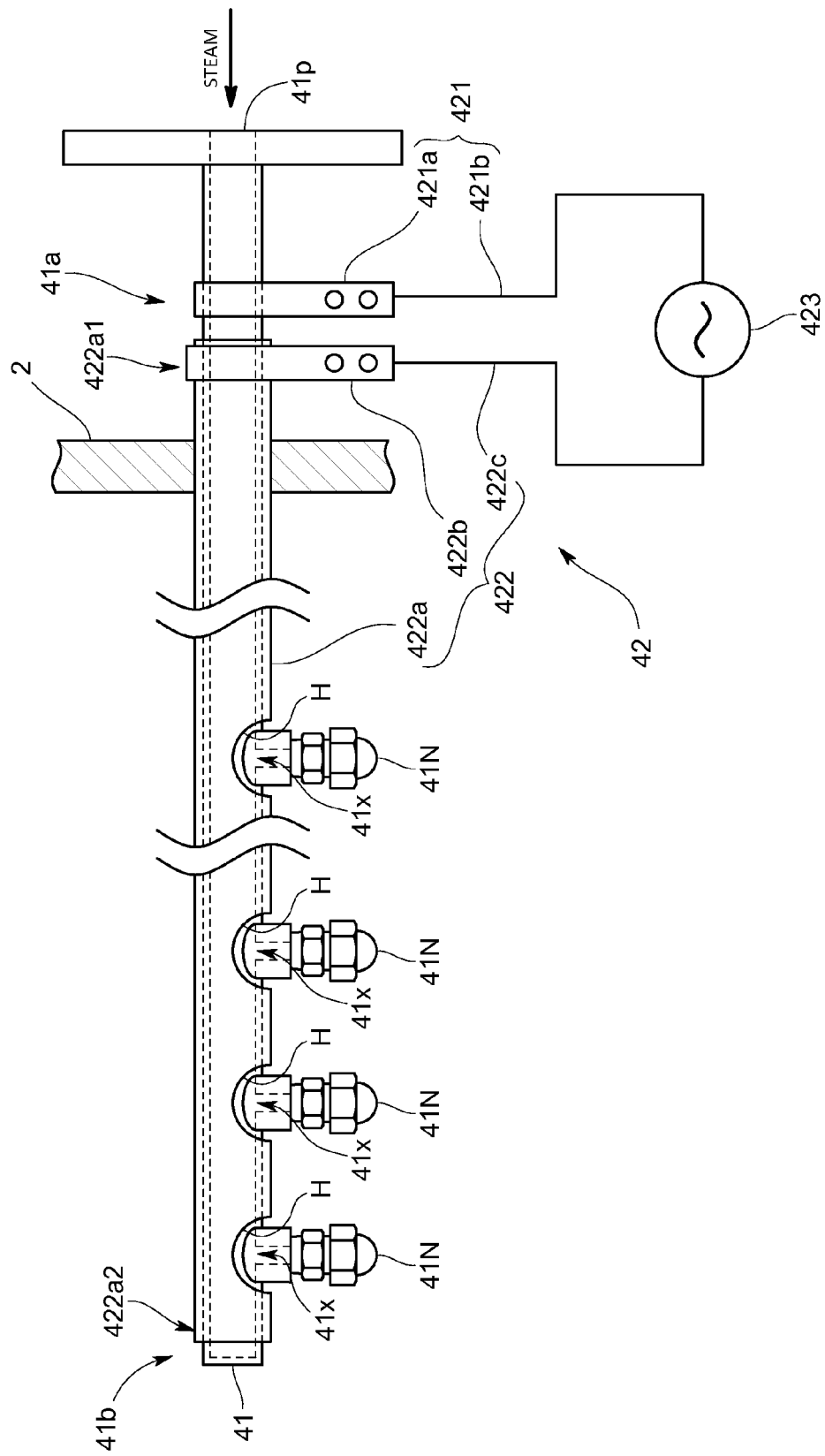
FIG. 2 is a schematic diagram showing a configuration of a superheated steam generating part of the same embodiment.

Specifically, as shown in FIG. 2, the superheated steam generating part 4 includes: a conductor pipe 41 which includes an inlet port 41p for introducing steam and an outlet port (ejection port) 41x for deriving (ejecting) the superheated steam; and an electric heating mechanism 42 for electrically heating the conductor pipe 41 to thereby generate the superheated steam.

The conductor pipe 41 is formed of a substantially cylindrical straight tubular pipe made of a conductive material such as, for example, stainless steel.

The electric heating mechanism 42 includes: a first power supply member 421 made of, for example, copper which is connected to one end side of the conductor pipe 41; a second power supply member 422 made of, for example, copper which is connected to the other end side of the conductor pipe 41; and an AC power supply 423 for applying a single-phase AC voltage between the first power supply member 421 and the second power supply member 422.

The first power supply member 421 includes: a first electrode 421*a* which is connected to one end portion 41*a* of the conductor pipe 41; and a first wire 421*b* which is connected to the first electrode 421*a* and connected to one output terminal of the AC power supply 423. The first electrode 421*a* is wound around the outer circumferential surface of the conductor pipe 41 and connected thereto by welding or the like.

Further, the second power supply member 422 includes: a covering body 422*a* which is connected to a position closer to the other end side than the first power supply member 421 in the conductor pipe 41; a second electrode 422*b* which is connected to one end side end portion 422*a*1 that is one end side of the flow path of the covering body 422*a*; and a second wire 422*c* which is connected to the second electrode 422*b* and connected to the other output terminal of the AC power supply 423. The second electrode 422*b* is wound around the outer circumferential surface of the covering body 422*a* and connected thereto by welding or the like.

Specifically, the covering body 422*a* is formed of a substantially cylindrical straight tubular pipe made of a conductive material. Further, the covering body 422*a* is intended to cover substantially an entire circumference of an outer circumferential surface from the other end side to the one end side of the conductor pipe 41 along the outer circumferential surface of the conductor pipe 41. Here, the covering body 422*a* has a diameter larger than that of the conductor pipe 41 and is arranged coaxially with the conductor pipe 41. In other words, the covering body 422*a* is formed to have a so-called double pipe structure together with the conductor pipe 41. Further, the covering body 422*a* is electrically connected to the outer circumferential surface of the conductor pipe 41 by welding at the other end side end portion 422*a*2 of the flow path.

Here, the conductor pipe 41 of the present embodiment is formed of a conductive material having an electrical resistance higher than those of the first and second power supply members 421 and 422. Specifically, in the case where the first and second power supply members 421 and 422 are formed of copper or brass, it is sufficient that the conductor pipe 41 is formed of a conductive material having an electrical resistance higher than those of copper or brass, and may be formed of, for example, stainless steel, titanium, or the like. Further, the first and second power supply members 421 and 422 may be made of the same material as the conductor pipe 41, and in this case, the thicknesses of the first and second power supply members 421 and 422 may be increased to have conductive cross-sectional areas thereof larger than that of the conductor pipe 41.

Thus, in the present embodiment, the other end portion of the conductor pipe 41 is closed, and a plurality of outlet ports 41*x* are provided, for example, at regular intervals along the flow path direction (i.e., pipe axis direction) on the outer circumferential surface of the conductor pipe 41. Each of the plurality of outlet ports 41*x* is provided with an ejection nozzle 41N. In FIG. 2, although the ejection nozzles 41N (outlet ports 41*x*) are provided on one side of the outer circumferential surface of the conductor pipe 41, the ejection nozzles 41N may be formed in the circumferential direction on the entire outer circumferential surface of the conductor pipe 41.

Further, in the covering body 422*a* of the second power supply member 422, a plurality of through holes H are formed at positions corresponding to the plurality of ejection nozzles 41N, and these ejection nozzles 41N are configured so as to be exposed outward through the corresponding through holes H. With this configuration having the ejection nozzles 41N, by selecting the ejection nozzles 41N in combination according to various applications, the superheated steam can be ejected to a predetermined injection range defined by the ejection nozzles 41N.

In addition, in a space between the conductor pipe 41 and the covering body 422*a*, there is provided an insulating member made of a ceramic material (not shown). Specifically, the insulating member is provided on the outer circumferential surface opposed to the covering body 422*a* in the conductor pipe 41. Here, the insulating member may be in contact with the inner circumferential surface of the covering body 422*a* or may be out of contact with the same. Further, the insulating member may be also provided on the inner circumferential surface of the covering body 422*a*. By this insulating member, it is possible to reliably insulate between the conductor pipe 41 and the covering body 422*a*, and a short circuit at a portion other than the connection portion can be prevented from occurring.

Further, on the outer circumferential surface of the covering body 422*a*, there is provided an outer insulating member (not shown) made of a ceramic material covering substantially the entire circumference of the outer circumferential surface of the covering body 422*a*. By providing this outer insulating member, electrical leakage from the covering body 422*a* to the outside can be prevented even in such a case where an installation object (i.e., heat treatment container 2 in the present embodiment) for installing the superheated steam generating part 4 is made of a conductive member or in a case where the installation object becomes conductive due to the ejected superheated steam.

Then, the first and second power supply members 421 and 422 are drawn out from one end portion 41*a* of the conductor pipe 41 to a side of the AC power supply 423. Specifically, the first electrode 421*a* is provided so as to be extended in a direction perpendicular to the flow path direction from the one end portion 41*a* of the conductor pipe 41 and the second electrode 422*b* is provided so as to be extended in the direction perpendicular to the flow path direction from an end portion 422*a*1 of one end side of the flow path of the covering body 422*a*. Note that the extending directions of the first and second electrodes 421*a* and 422*b* are not necessarily the same, but may be different directions, for example, in the circumferential direction in the one end portion 41*a* of the flow path.

The superheated steam generating part 4 configured as described above is provided by being inserted from one end wall in the shaft direction of the heat treatment container 2 into the inside of the heat treatment container 2 as shown in FIG. 2. Specifically, the superheated steam generating part 4 is provided by inserting a portion, excluding the one end portion 41*a* of the flow path of the conductor pipe 41, into the inside of the heat treatment container 2. Further, the conductor pipe 41 is provided on the rotating shaft of the heat treatment container 2 inside the same, and therefore, the plurality of ejection nozzles 41N are provided along this rotating shaft.

With the heat treatment container 2 and the superheated steam generating part 4 configured as described above, the organic substance is thermally decomposed to produce thermally decomposed gas. This thermally decomposed gas is sent to the catalyst part 5 via the gas outlet port part 23 formed in the heat treatment container 2 as shown in FIG. 1. This gas outlet port part 23 is provided in one end wall in the shaft direction to which the superheated steam generating part 4 is inserted. Specifically, the gas outlet port part 23 is configured of an outlet port pipe 231 concentrically arranged with the covering body 422a of the superheated steam generating part 4. This outlet port pipe 231 is extended to the outside of the heat treatment container 2 and connected to the catalyst part 5. By this catalyst part 5, the cracked oil and hydrocarbon gas can be extracted and recovered. Moreover, the hydrogen gas can be taken out using this hydrocarbon gas by the hydrogen gas synthesis part and it is possible to synthesize ammonia by an ammonia synthesis part using this hydrogen gas. Further, the gas passed through the catalyst part 5 is sent to a cooling part 6. By this cooling part 6, light oil can be extracted and recovered.

According to the oil purifying apparatus 100 configured as described above, since the superheated steam generating part 4 is provided in the heat treatment container 2 in which the organic substance is thermally decomposed and is configured so as to generate the superheated steam inside the heat treatment container 2, a piping facility for the superheated steam can be made unnecessary. Therefore, it is possible to eliminate a heating quantity inputted to the conventional piping facility for the superheated steam or a heating quantity of a heat loss due to heat radiation of the piping facility, and thus the heat recovery efficiency by the oil purifying apparatus 100 can be improved. Further, by providing the superheated steam generating part 4 inside the heat treatment container 2, the oil purifying apparatus 100 can be made smaller than the conventional one.

Further, according to the oil purifying apparatus 100 of the present embodiment, in the case where a single-phase AC voltage is applied from the AC power supply 423 to the conductor pipe 41 via the first and second power supply members 421 and 422, the current flowing through the conductor pipe 41 in the conductor pipe 41 and the current flowing through the covering body 422a in the second power supply member 422 are in opposite directions. Therefore, magnetic fluxes generated by the respective currents are cancelled by each other and a reactance generated in the conductor pipe 41 is reduced, and it is possible to improve a circuit power factor. Therefore, it is possible to improve the equipment efficiency of the oil purifying apparatus 100.

Further, since the superheated steam can be directly ejected from the outlet ports 41x (ejection nozzles 41N) provided on the conductor pipe 41, the superheated steam can be ejected without lowering the temperature of the superheated steam inside the conductor pipe 41. Moreover, since the covering body 422a is made of copper or brass and the conductor pipe 41 is formed of a conductive material having an electrical resistance higher than that of the covering body 422a, the conductor pipe 41 in which the superheated steam flows can be efficiently heated without heating the covering body 422a by a current application, the superheated steam can be efficiently heated to a high temperature state.

Note that the present invention is not limited to the above embodiment.

For example, the conductor pipe and the covering body are not limited to cylindrical straight tubular shapes and each of the shapes in cross section may be also polygonal, oval, or composed of, for example, freeform curves. Further, the shapes of the conductor pipe and the covering body in cross section may not be the same, and, for example, the conductor pipe may have a square shape in cross section and the covering body may have an oval shape.

Further, the conductor pipe and the covering body are not limited to straight shapes, but may have curved shapes. For example, in the case where the conductor pipe is curved, the covering body may be also formed along the curved outer circumferential surface of the conductor pipe. Also, in this case, a plurality of outlet ports are provided along the flow path direction.

Figure 3:
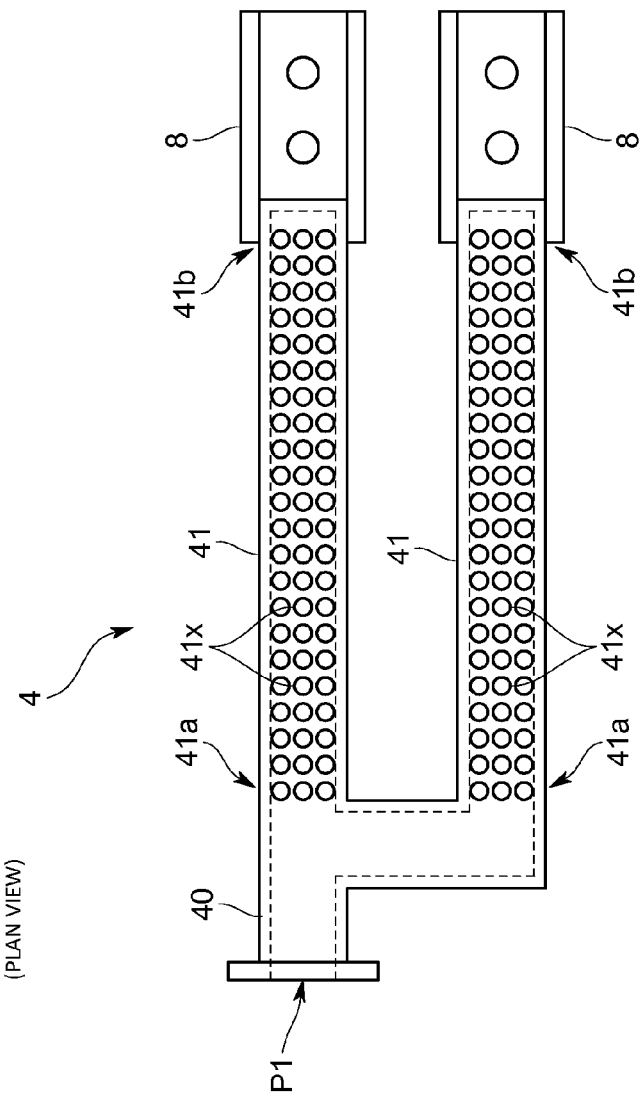
FIG. 3 is a schematic diagram showing a modified example of a superheated steam generating part.
Figure 4:
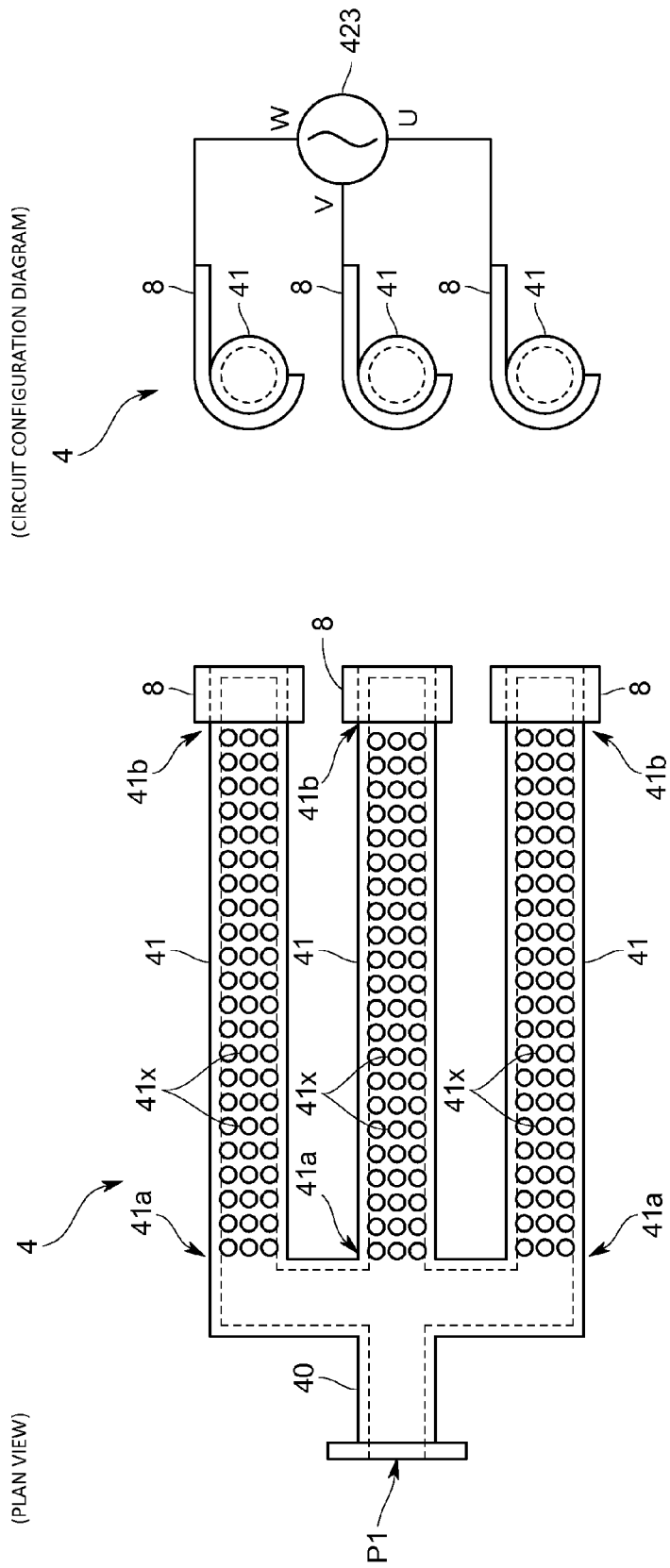
FIG. 4 is a schematic diagram showing a modified example of a superheated steam generating part.

Furthermore, as the configuration of the superheated steam generating part, those shown in FIGS. 3 and 4 may be also used.

The superheated steam generating part 4 shown in FIG. 3 has two conductor pipes 41 arranged so as to be in parallel to each other, and the one end portions 41a, which are fluid introduction sides of the two conductor pipes 41, may be also electrically connected to each other. Each of the conductor pipes 41 is a straight tubular cylindrical pipe and is formed to be the same shape.

Specifically, the one end portions 41a of the two conductor pipes 41 are electrically connected by a conductive distribution pipe 40. This distribution pipe 40 is connected to the one end portions 41a of the two conductor pipes 41 and it is intended to distribute the steam to the two conductor pipes 41. Further, in this embodiment, the conductor pipes 41 and the distribution pipe 40 are integrally configured.

Further, the other end portions 41b of the two conductor pipes 41 are closed and a plurality of ejection ports 41x are formed on the side walls intermediately extending between the one end portions 41a and the other end portions 41b of the two conductor pipes 41. The plurality of ejection ports 41x may be formed on the entire circumferential surfaces of the side walls of the conductor pipes 41 and also may be formed on one direction side perpendicular to the arrangement direction on the side walls of the conductor pipes 41. In FIG. 3, although the plurality of ejection ports 41x are formed over substantially the entirety of the side walls in the longitudinal direction from the one end portions 41a to the other end portions 41b, the plurality of ejection ports 41x may be also formed on partial portions in the longitudinal direction, for example, in parts ranging from the center portions in the longitudinal direction to the other end portions 41b of the conductor pipes 41.

Thus, the piping structure of this superheated steam generating part 4 is configured to have one inlet port P1 in the upstream side and two flow paths branched in the downstream side thereof so that the heated superheated steam is ejected from each of the flow paths through the plurality of ejection ports 41x.

Then, the AC power supply 423 for applying a single-phase AC voltage is connected to the closed other end portions 41b of the two conductor pipes 41. Specifically, a U-phase of the single-phase AC power supply 423 is connected to one of the other end portions 41b of the two conductor pipes 41, and a V-phase of the single-phase AC power supply 423 is connected to the other of the other end portions 41b of the two conductor pipes 41. As shown in FIG. 3, an electrode 8 to be connected to the other end portion 41b of each of the conductor pipes 41 is shaped to be in contact along the outer circumferential surface of each conductor pipe 41 and this electrode 8 is provided in a manner of extending outward from the other end portion 41b of each conductor pipe 41. Specifically, each of the conductor pipes 41 has a circular pipe shape and the electrode 8 has a partially cylindrical and so-called semi-circular trough shape. This electrode 8 is connected to the other end portion 41b of the conductor pipe 41 by welding or the like. Thus, since the electrode 8 has a semi-circular trough shape and extends along the longitudinal direction of the conductor pipe 41, the electrode 8 is not a hindrance when attaching or removing the conductor pipe 41 to or from the heat treatment container 2.

In the superheated steam generating part 4 configured as described above, upon application of a single-phase AC voltage from the AC power supply 423 to the conductor pipes 41 via the electrodes 8, the direction of current flowing in one of the conductor pipes 41 and the direction of current flowing in the other of the conductor pipes 41 are opposite to each other. Therefore, magnetic fluxes generated by the respective currents are cancelled by each other and an impedance generated in each of the conductor pipes 41 is reduced and it is possible to improve a circuit power factor. Therefore, it is possible to improve the equipment efficiency of the oil purifying apparatus 100. Moreover, since the plurality of ejection ports 41x are formed between the one end portions 41a and the closed other end portions 41b of the conductor pipes 41, it is possible to improve the usability of the oil purifying apparatus 100 when using the heated superheated steam under dispersion.

In the superheated steam generating part 4 shown in FIG. 4, three conductor pipes 41 are arranged so as to be in parallel to one another, and the one end portions 41a, which are fluid introduction sides of the three conductor pipes 41, are electrically connected to one another. Each of the conductor pipes 41 is a straight tubular cylindrical pipe and is formed to be the same shape. Further, the three conductor pipes 41 are arranged at regular intervals on the same plane.

Specifically, the one end portions 41a of the three conductor pipes 41 are electrically connected by a conductive distribution pipe 40. This distribution pipe 40 is connected to the one end portions 41a of the three conductor pipes 41 and it is intended to distribute the steam to the three conductor pipes 41. Further, in this embodiment, the conductor pipes 41 and the distribution pipe 40 are integrally configured.

Further, the other end portions 41b of the three conductor pipes 41 are closed and a plurality of ejection ports 41x are formed on the side walls intermediately extending between the one end portions 41a and the other end portions 41b of the respective conductor pipes 41. The plurality of ejection ports 41x may be formed on the entire circumferential surfaces of the side walls of the conductor pipes 41 and also may be formed on one direction side perpendicular to the arrangement direction on the side walls of the conductor pipes 41. In FIG. 4, although the plurality of ejection ports 41x are formed over substantially the entirety of the side walls in the longitudinal direction from the one end portions 41a to the other end portions 41b, the plurality of ejection ports 41x may be also formed on partial portions in the longitudinal direction, for example, the ejection ports 41x may be formed in a range from the center portions in the longitudinal direction to the other end portions 41b of the conductor pipes 41.

Thus, the piping structure of this superheated steam generating part 4 is configured to have one inlet port P1 in the upstream side and three flow paths branched in the downstream side thereof so that the heated superheated steam is ejected through the plurality of ejection ports 41x from each of the flow paths.

Then, the AC power supply 423 for applying a three-phase AC voltage is connected to the other end portions 41b serving as the fluid outlet port sides of the three conductor pipes 41. Specifically, a U-phase of the three-phase AC power supply 423 is connected to the first other end portions 41b of the three conductor pipes 41, a V-phase of the three-phase AC power supply 423 is connected to the second other end portions 41b of the three conductor pipes 41, and a W-phase of the three-phase AC power supply 423 is connected to the third other end portions 41b of the three conductor pipes 41. As shown in FIG. 4, the electrode 8 to be connected to the other end portion 41b of each of the conductor pipes 41 is connected to the other end portion 41b of the conductor pipe 41 by welding or the like in a manner of being wound around a part of the outer circumferential surface of the other end portion 41b. These electrodes 8 are provided so as to be extended outward in a direction perpendicular to the arrangement direction of the three conductor pipes 41.

In the superheated steam generating part 4 configured as described above, upon application of the three-phase AC voltage from the three-phase AC power supply 423 to the conductor pipes 41 via the electrodes 8, the magnetic fluxes generated by the respective currents flowing in the three conductor pipes 41 are mutually cancelled, an impedance generated in each of the conductor pipes 41 is reduced, and it is possible to improve a circuit power factor. Therefore, it is possible to improve the equipment efficiency of the oil purifying apparatus 100.

The oil purifying apparatus of this embodiment may further include a metal extraction part for extracting metals from residue resulting from the thermal decomposition of the organic substance. This metal extraction part is intended to thermally decompose the residue discharged from a discharge portion of the heat treatment container using the superheated steam to thereby extract metals. As the metals to be extracted, rare metals such as platinum or gold, and metals such as aluminum, copper, and the like are considered.

In addition, the present invention is not limited to the above embodiments, and it is needless to say that various modifications of the embodiments can be made without departing from the spirit of the present invention.

REFERENCE CHARACTER LIST

100 Oil purifying apparatus
2 Heat treatment container
4 Superheated steam generating part
41 Conductor pipe
42 Electric heating mechanism
421 First power supply member
422 Second power supply member
422a Covering body
423 AC power supply
41N Ejection nozzle
H Through hole

The invention claimed is:
1. An oil purifying apparatus for thermally decomposing an organic substance with superheated steam and purifying oil from gas components generated by thermal decomposition, comprising:
a heat treatment container for storing the organic substance; and a superheated steam generating part for generating the superheated steam to be supplied into the heat treatment container, wherein the superheated steam generating part is provided in the heat treatment container, the superheated steam generating part comprises: a conductor pipe having an inlet port for introducing water or steam into the superheated steam generating part and an outlet port for deriving the superheated steam; and an electric heating mechanism for electrically heating the conductor pipe and causing the superheated steam to be generated, the conductor pipe is formed to have a straight pipe shape and a plurality of outlet ports are provided along a flow path direction in an outer surface of the conductor pipe, characterized in that the electric heating mechanism comprises: a first power supply member connected to one end side of the conductor pipe; a second power supply member connected to another end side of the conductor pipe; and an AC power supply for applying an AC voltage between the first power supply member and the second power supply, wherein the second power supply member has a covering body covering substantially an entire circumference of an outer circumferential surface from the other end side to the one end side of the conductor pipe, and wherein an end of the other end side is electrically connected to the conductor pipe.

2. The oil purifying apparatus according to claim 1, wherein a plurality of ejection nozzles are provided along the flow path direction in the outer surface of the conductor pipe, and wherein one or more through holes are formed in the covering body corresponding to the plurality of ejection nozzles in order to expose the plurality of ejection nozzles outside of the conductor pipe.

3. The oil purifying apparatus according to claim 1, wherein the heat treatment container is a rotary kiln, and the superheated steam generating part is provided along a rotating shaft of the rotary kiln inside the same.

4. The oil purifying apparatus according to claim 1, further comprising a metal extraction part for extracting metal from residue resulting from the thermal decomposition of the organic substance.

* * * * *